US011038911B2

(12) United States Patent
Boulton

(10) Patent No.: US 11,038,911 B2
(45) Date of Patent: Jun. 15, 2021

(54) METHOD AND SYSTEM FOR DETERMINING RISK IN AUTOMOTIVE ECU COMPONENTS

(71) Applicant: BlackBerry Limited, Waterloo (CA)

(72) Inventor: Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 181 days.

(21) Appl. No.: 16/165,435

(22) Filed: Oct. 19, 2018

(65) Prior Publication Data
US 2020/0128034 A1 Apr. 23, 2020

(51) Int. Cl.
H04L 29/06 (2006.01)
G06F 21/57 (2013.01)

(52) U.S. Cl.
CPC ........ H04L 63/1433 (2013.01); G06F 21/577 (2013.01); H04L 63/1425 (2013.01); G06F 2221/033 (2013.01)

(58) Field of Classification Search
CPC ............. H04L 63/1433; H04L 63/1425; H04L 2012/40215; H04L 2209/84; H04L 63/1408; G06F 21/577; G06F 2221/033; G06F 21/566; G06F 21/563
USPC .......................................................... 726/25
See application file for complete search history.

(56) References Cited

U.S. PATENT DOCUMENTS

| 5,919,258 | A * | 7/1999 | Kayashima | H04L 69/40 726/23 |
| 8,635,291 | B2 * | 1/2014 | Keast | H04L 51/24 709/206 |
| 9,160,760 | B2 * | 10/2015 | Vasseur | H04L 63/1425 |
| 9,401,923 | B2 * | 7/2016 | Valasek | H04L 63/1408 |
| 9,432,389 | B1 * | 8/2016 | Khalid | H04L 63/1425 |
| 2005/0076227 | A1 * | 4/2005 | Kang | H04L 63/1416 713/188 |
| 2014/0355412 | A1 * | 12/2014 | Romero Bueno | G08C 25/00 370/217 |
| 2015/0020196 | A1 * | 1/2015 | Wijbrans | H04L 63/1416 726/22 |
| 2015/0113638 | A1 * | 4/2015 | Valasek | G06F 21/562 726/22 |
| 2015/0128274 | A1 * | 5/2015 | Giokas | H04L 63/1425 726/23 |
| 2015/0150124 | A1 * | 5/2015 | Zhang | G06F 21/51 726/22 |
| 2015/0341379 | A1 * | 11/2015 | Lefebvre | H04W 12/08 726/22 |
| 2017/0013005 | A1 * | 1/2017 | Galula | H04L 63/20 |

(Continued)

OTHER PUBLICATIONS

European Patent Office, extended European search report for Application No. 19201362.1, dated Feb. 3, 2020.

Primary Examiner — Badri Narayanan Champakesan
(74) Attorney, Agent, or Firm — Moffat & Co

(57) ABSTRACT

A method at a computing device for determining processing characteristics of nodes within a system, the method including receiving at the computing device a plurality of messages being passed within the system; analyzing a payload for each message of the plurality of messages to determine one or more message identifiers; performing an analysis of a binary image for each node within the system to find nodes filtering for the one or more message identifiers; and determining a relative amount of processing done by each of the nodes based on the plurality of messages.

13 Claims, 5 Drawing Sheets

(56) References Cited

U.S. PATENT DOCUMENTS

| | | | |
|---|---|---|---|
| 2017/0054574 A1* | 2/2017 | Wu | H04L 12/4641 |
| 2017/0295188 A1* | 10/2017 | David | H04L 63/101 |
| 2018/0204011 A1* | 7/2018 | Nakano | G06F 21/567 |
| 2018/0255084 A1* | 9/2018 | Kotinas | G06K 9/6218 |
| 2018/0316584 A1* | 11/2018 | Ujiie | H04L 63/1416 |
| 2018/0324219 A1* | 11/2018 | Xie | H04L 63/1433 |
| 2019/0319926 A1* | 10/2019 | Cummins | H04L 63/0263 |
| 2019/0347232 A1* | 11/2019 | Giusto | G06F 13/4027 |

* cited by examiner

| SOF | Message Identifier | RTR | Control | Data | CRC | ACK | EOF |
|---|---|---|---|---|---|---|---|
| 410 | 412 | 414 | 416 | 420 | 422 | 424 | 426 |

METHOD AND SYSTEM FOR DETERMINING RISK IN AUTOMOTIVE ECU COMPONENTS

FIELD OF THE DISCLOSURE

The present disclosure relates to analyzing binary software components, and in particular relates to determining risk by analyzing the binary software components.

BACKGROUND

Binary static analysis involves examination of a compiled or binary representation of a software program and inferring various functionalities without actually executing the program. Disassembling a binary software program can include translating the compiled or binary representation of the program into assembly language.

Performing binary static analysis on an image allows for determination of the range of characteristics and attributes for the given image. However, without execution of the software program, attack surfaces cannot be determined completely.

BRIEF DESCRIPTION OF THE DRAWINGS

The present disclosure will be better understood with reference to the drawings, in which.

DETAILED DESCRIPTION OF THE DRAWINGS

Figure 1:
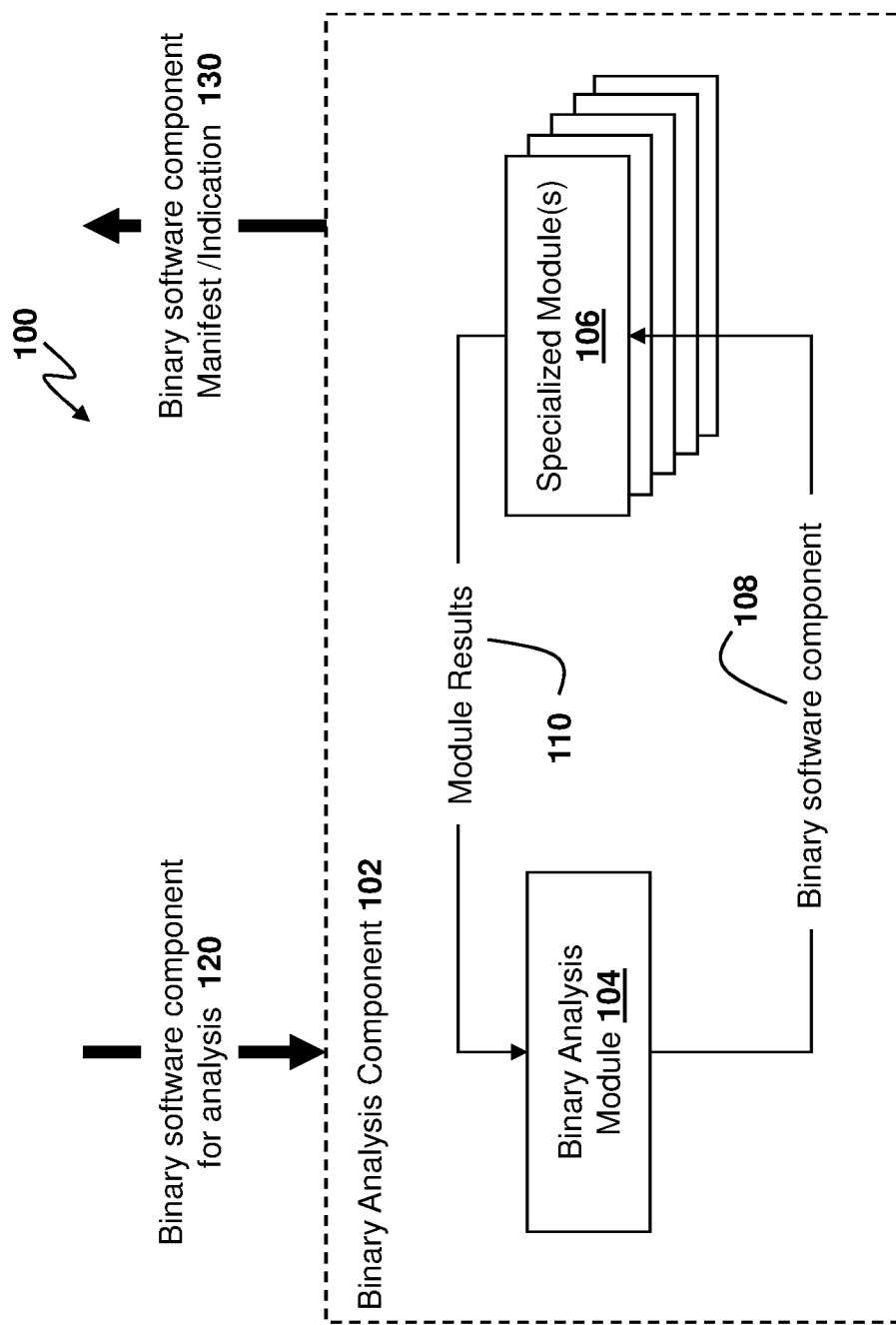
FIG. 1 is a block diagram of a system for performing static analysis of a binary image.

The present disclosure provides a method at a computing device for determining processing characteristics of nodes within a system, the method comprising: receiving at the computing device a plurality of messages being passed within the system; analyzing a payload for each message of the plurality of messages to determine one or more message identifiers; performing an analysis of a binary image for each node within the system to find nodes filtering for the one or more message identifiers; and determining a relative amount of processing done by each of the nodes based on the plurality of messages.

The present disclosure further provides a computing device for determining processing characteristics of nodes within a system, the computing device comprising: a processor; and a communications subsystem, wherein the computing device is configured to: receive a plurality of messages being passed within the system; analyze a payload for each message of the plurality of messages to determine one or more message identifiers; perform an analysis of a binary image for each node within the system to find nodes filtering for the one or more message identifiers; and determine a relative amount of processing done by each of the nodes based on the plurality of messages.

The present disclosure further provides a computer readable medium for storing instruction code for determining processing characteristics of nodes within a system, the instruction code when executed by a processor of a computing device cause the computing device to: receive a plurality of messages being passed within the system; analyze a payload for each message of the plurality of messages to determine one or more message identifiers; perform an analysis of a binary image for each node within the system to find nodes filtering for the one or more message identifiers; and determine a relative amount of processing done by each of the nodes based on the plurality of messages.

The embodiments described below provide for a combination of dynamic and static analysis on software within a system. The example systems provided below are automotive systems in which a plurality of electronic control units (ECUs) can communicate with each other over a network such as a Controller Area Network (CAN) bus. However, the methods and systems described herein could equally be used in other systems, or even in an alternative automotive scenarios utilizing other communication technologies. Therefore, the techniques of present disclosure are not limited to any particular system.

In some cases, software programs may execute in systems connected to, or accessible via, public networks such as the Internet. Malicious actors can use various exploitative techniques to influence the behaviour of a network-connected software program. In other cases, malicious actors with access to the system may insert malicious code into the system software to influence the behaviour of the software.

For example, a modern vehicle may have over 100 million lines of software code. As software in a vehicle grows, so does an attack surface, which makes such software vulnerable to attacks. Each poorly constructed piece of software represents a potential vulnerability that can be exploited by attackers.

In this regard, methods and systems are provided which may analyse software within a system to detect vulnerabilities. For example, static analysis may be performed on the binary code within a system. Through binary static analysis, a range of characteristics and attributes for a given software image may be determined. As used herein, a software image comprises binary code which was compiled from source code, and is thus not readily readable by a person.

However, by merely performing static analysis, certain aspects of an attack surface cannot be determined. For example, the amount of processing by a processor within the system, such as an ECU, cannot be determined merely by examining the binary code in a static analysis.

Therefore, in accordance with the present disclosure, dynamic and static analysis are combined in order to augment the analysis and build a better understanding of an attack surface.

In particular, differences between static and dynamic analysis means that both testing types lack visibility of the other testing type. However, combining the two using a feedback or augmentation loop bridges these gaps.

Each type of analysis is described below, and the combination of the two is then described.

Static Analysis

Binary static analysis allows binary software components to be analyzed without referring to the high-level source code from which the binary software component was compiled. Binary static analysis is performed by examining the content and structure of the binary data making up the binary software component. Using these techniques, characteristics of the binary software component can be identified, including, but not limited to, functions defined in the program, application programming interfaces (APIs) used by the program, compiler defensive techniques implemented in the functions defined in the program, message filtering identfiers accepted by the program, and other characteristics of the binary software component. Due to the general unavailability of corresponding high-level source code to users of binary software components, analyzing the complexity of a binary software component using binary static analysis would allow users to more easily evaluate the likelihood of bugs and logic errors occurring during execution of the binary software component.

Binary software components are binary files including instructions to be executed by a processor. A binary software component may be generated from a set of source code by a compiler program, which translates the source code into instructions specific to a particular processor (e.g., INTEL CORE I7) or processor architecture (e.g., ARM). The binary software component may include a number of code blocks that equate roughly to functions defined in source code.

Generally, file formats used to encode binary software components (e.g., Executable and Linkable Format (ELF)) indicate areas of the file where executable code resides, but they do not indicate the locations of individual functions and data. In some cases, it may be possible to identify functions by using a symbol table encoded in the file. This table, however, may not contain references to all functions and in some cases may not be included in the file. A map identifying the start and end locations of functions, as well as data components for the function, may be used to perform a binary static analysis on the binary software component.

In addition, binary software components compiled for some processor architectures (e.g., ARM) may contain a mixture of instruction sets. For example, a binary software component compiled for the ARM architecture may include instructions from the ARM 32-bit instruction set, as well as instructions from the THUMB 16-bit instruction set. In some cases, a binary software component may not include any indication regarding which code blocks use which instruction set.

In other cases, binary static analysis may involve examining a binary software component for other vulnerabilities. For example, the static analysis may look for instances where a stack overflow may occur, thereby providing access to a malicious player to insert code into the stack.

In still further cases, the complexity characteristics of a piece of code may be analysed to look for potential vulnerabilities.

In still further cases, a binary image for a particular node may be analysed to determine whether that node accepts messages from a bus or similar messaging medium, and may further provide for identifiers for messages that will be accepted from the bus or other similar messaging medium.

In still further cases, other vulnerabilities may be considered during a binary static analysis, and the present disclosure is not limited to any particular analysis performed during a binary static analysis.

FIG. 1 provides additional details for the performance of a binary static analysis. FIG. 1 is a schematic diagram showing a system 100 that identifies different characteristics or vulnerabilities within a binary software component using binary static analysis, according to one embodiment. The system 100 includes a binary analysis component 102, which can include a binary analysis module 104 and one or more specialized modules 106. The binary analysis component 102 can include a system for performing binary static analysis on software components to generate a manifest or indication 130 including characteristics or potential vulnerabilities of the binary software component determined during the analysis. The binary analysis component 102 can include one or more computing devices executing software programs, such as the binary analysis module 104 and the one or more specialized modules 106, to perform portions of the analysis of software components.

For example, specialized modules 106 may include, but are not limited to, a stack cookie detector to detect whether cookies are being placed on a stack; a binary mapper module to map the various binary components to a particular processor or instruction set; a complexity analysis module to determine complexity characteristics within the binary code; a message ID filter identification module to find message identifiers that a node will accept, among other options.

In an example operation, the binary analysis component 102 can receive a binary software component 120 for analysis. The source of the binary software component can be, for example, a software build environment, a software deployment manager, or an executable file (not shown). The binary analysis module 104 of the binary analysis component 102 can perform binary static analysis on the binary software component. In some cases, the binary analysis module 104 performs this analysis utilizing a module results 110 generated by the one or more specialized modules 106. The binary analysis module may provide the binary software component (or a reference to it) to the one or more specialized modules 106, as for example shown with binary software component 108. The one or more specialized modules 106 may perform various functionality based on the type of module and the purpose of the module.

In some implementations, the module results 110 may include information about program sections (e.g., functions, data structures) included in the binary software component, including, but not limited to, an instruction set utilized by the program section, a starting location of the program section within the binary software component, an ending location of the program section within the binary software component, or other information. The binary analysis module 104 may use the module results 110 to perform the binary static analysis of the binary software component. For example, the binary analysis module 104 may iterate through each program section in a software map, and begin its analysis at the specified starting location within the binary software component. The binary analysis module 104 may also use the instruction set specified for the function in the module results 110 to disassemble the instructions for each program section during its analysis of the binary software component.

In one case, the specialized modules 106 may include a module used to identify message ID filters within the binary image for a computing node such as an ECU within a vehicle. In particular, as described below, various bus messages may have a message ID, which each node may check to determine whether the node wants to act on such message or not. In this regard, finding the message IDs that an ECU or other similar node is interested in permits a combination of static and dynamic analysis as described below.

Figure 2:
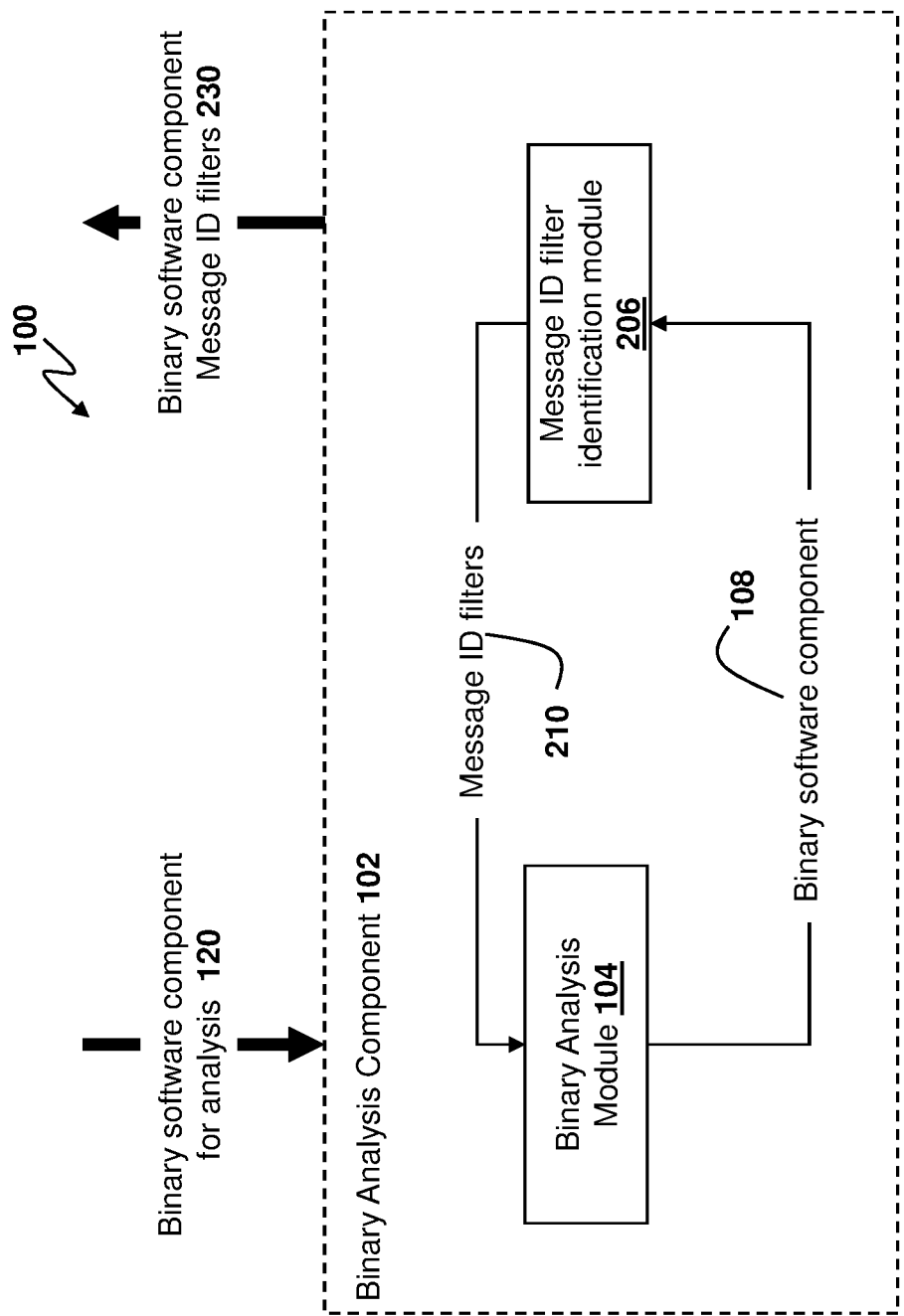
FIG. 2 is block diagram of system for finding message identifier filters within a binary image.

Reference is now made to FIG. 2, which shows a specific message ID filter identification module 206 as being part of the a binary analysis component 102. Similar reference numerals to those provided above with regard to FIG. 1 are used in FIG. 2 for similar elements.

In particular, for each ECU, the binary analysis component 102 may receive a binary software component for analysis, shown with reference numeral 120.

The binary analysis component 102 utilizes a binary analysis module 104 which may send the binary software component 108 to the message ID filter identification module 206. The message ID filter identification module 206 may then provide the message ID filters for the component, shown with message 210, back to the binary analysis module 104.

Once the message ID filters have been identified, the process may return the binary software component message ID filters 230.

CAN Bus

In accordance with the examples below, communication between the various nodes in a system may be done via a network such as a CAN bus. The present disclosure is not however limited to the use of a CAN bus, but rather could be applicable to any system in which messages include an identifier which is filtered by the various nodes to determine whether the message is directed to that node.

The controller area network protocol is a serial communications protocol for communications between the various nodes such as electronic control units. For example, in an automotive context, ECUs can be the engine control unit, airbags, audio system, among others. A modern vehicle may have 70 or more ECUs.

The CAN protocol allows ECUs to communicate with each other without complex dedicated wiring between each node. Thus, the purpose of the controller area network is to allow the ECUs to communicate with the entire system without causing an overload to a controller computer.

In a CAN bus system, each node contains a chip for receiving all transmitted messages that are sent on the data lines, deciding the relevance of such messages, and then acting on the messages accordingly. This allows easy modification and inclusion of additional nodes within the network.

Figures 3, 4:
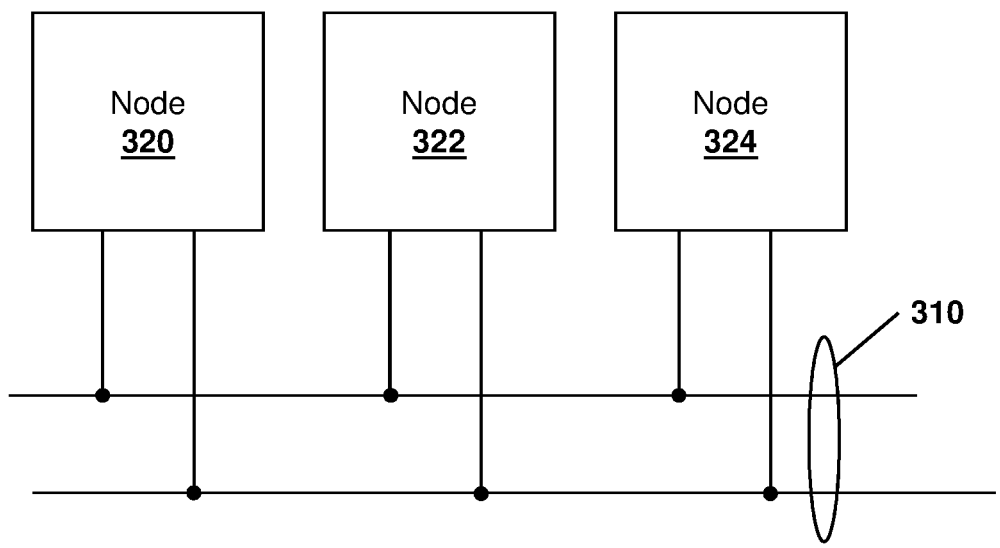
FIG. 3 is a block diagram showing an bus architecture for dynamic analysis.
FIG. 4 is a block diagram components within a Controller Area Network message.

In particular, reference is now made to FIG. 3. In the embodiment of FIG. 3, a CAN bus 310 is shown comprising two lines.

A plurality of nodes are shown connected to CAN bus 310. In particular, nodes 320, 322 and 324 are connected to CAN bus 310 in the example of FIG. 3. Each of nodes 320, 322 and 324 include a central processing unit, microprocessor or host processor which decides when received messages are directed to that node and further decides which messages the node wants to transmit.

Each node is able to send and receive the messages, but not simultaneously.

In one example, node 320 may want to transmit data on the CAN bus 310. In this regard, the node 320 would prepare the data and send the data on a CAN bus 310.

The remaining nodes would monitor the CAN bus and in this case each of nodes 322 and 324 would receive the data and check the data. In the example of FIG. 3, node 322 is interested in the data based on the message identifier within the message and may therefore accept the data.

Conversely, node 324 is not interested in the message based on its message identifier, and after checking the data it may ignore the data.

A typical CAN bus message is shown with regard to FIG. 4. In particular, the CAN bus message of FIG. 4 may have a start of frame (SOF) 410, after which it may include a message identifier 412. The message identifier 412 may be different lengths based on the CAN specification being used. In some cases, the different lengths may be considered to be standard and extended lengths. For example, in CAN 2.0, the message identifier length may be 29 bits.

After the message identifier 412, the CAN message may include a remote transmission request (RTR) 414.

The message may further include control bits 416.

Data may be transmitted in data field 420. Further, a cyclic redundancy check (CRC) 422 may be included.

The message may include an acknowledgement field 424, as well as an end of frame (EOF) 426.

As seen from the FIGS. 3 and 4 described above, the CAN protocol allows for flexibility by allowing any number of devices to be added to the CAN bus, where each will monitor message identifiers to determine whether messages are of interest to that component or node. This eliminates problems with addressable messages, but presents issues for those monitoring messages to determine who is performing processing on such messages.

Dynamic Analysis

Dynamic analysis occurs during system operation. In particular, a node such as node 320, 322 or 324 may be placed on the CAN bus and may monitor traffic on the CAN bus. This allows for message payloads to be captured and logged to provide an indication of system utilization.

The logging of the data may, in some cases, provide for indications of faults within the system. In particular, error messages or messages that are formatted incorrectly, an unusually high volume of messages, among other factors, may indicate that there are problems within the system.

Therefore, dynamic analysis allows for the evaluation of a system that is running. In particular, dynamic analysis may not have visibility of the binary code, but may determine various behaviours purely based on output of an application.

While messages may be logged, the ECU or other network component that is processing such messages would not readily be known.

In this regard, in one embodiment of the present disclosure, static and dynamic analysis may be combined to build a greater understanding of an attack surface for a system such as a vehicle.

Combined Static and Dynamic Analysis

The differences between static and dynamic analysis means that both types of testing lack visibility. However, being able to combine the two by means of the feedback or augmentation loop allows a combined analysis to bridge the gap between static and dynamic analysis.

Figure 5:
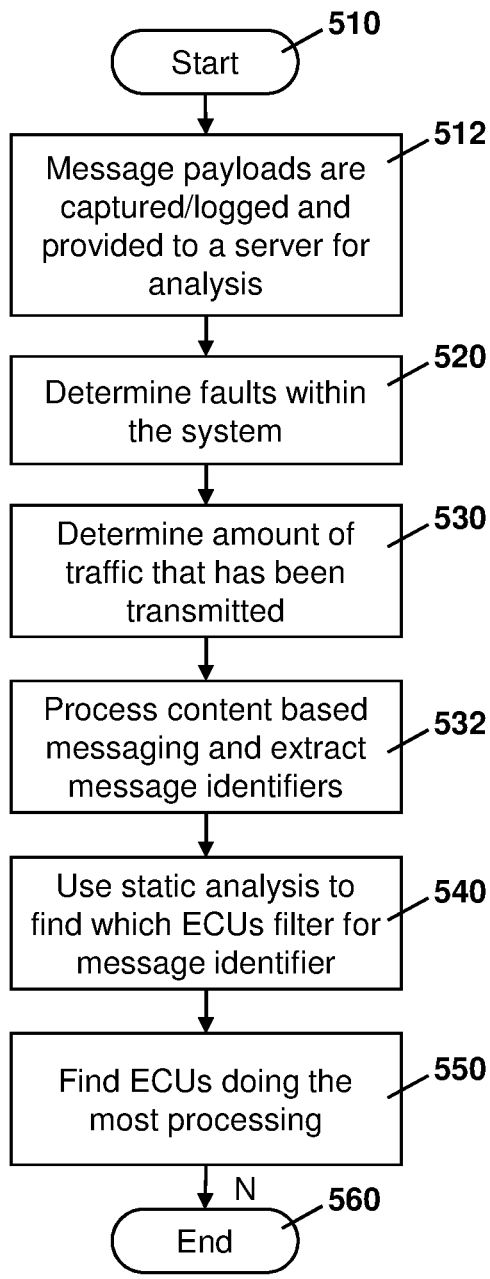
FIG. 5 is a process diagram combining static and dynamic analysis to find processing characteristics of nodes within a system.

Reference is now made to FIG. 5, which shows one example system which provides feedback from static and dynamic analysis to perform a risk assessment for a system. The process of FIG. 5 is merely one example, and other processes employing similar elements would be apparent to those skilled in the art having regard to the present disclosure.

The process of FIG. 5 starts at block 510 and proceeds to block 512 in which a dynamic analysis may begin. In particular, a system may capture and log messages that are being passed on a network such as a CAN bus. The system may then further provide the messaging to a server for analysis.

A server may receive the message payloads from block 512 and proceed to block 520 in which faults within the system may be determined based on dynamic data. In particular, the faults may indicate error messages or other unusual CAN content, a higher volume of messages than expected, among other anomalies.

From block 520, the process proceeds to block 530 in which an amount of traffic that has been transmitted may be determined. However, as CAN messages do not have identifiers for the elements that will be processing such messages, an analysis of the messages by themselves does not provide details with regard to which nodes or ECUs will be processing such messages.

In this regard, the process proceeds to block 532 in which the message content may be extracted to find message identifiers within the messages. For example, such message identifiers may be standard or extended message identifiers within each frame.

From block 532, the process proceeds to block 540 in which a static analysis of the binary images for each ECU or node may be made. As will be appreciated by those in the art, the identification of the message identifiers at block 540 could utilize the system of FIG. 2 and could be done once per system. Furthermore, the evaluation at block 540 could be done for a new node or ECU as it is added to the system in some cases.

The results of the processing at block 540, combined with the message identifiers found at block 532, allows a correlation between the messages on the CAN bus and the ECUs that are doing the processing. Therefore, through static analysis of binary images of the nodes or ECUs that are performing acceptance filtering and the message identifiers within the active CAN bus, the messages that will be processed by each ECU can be identified.

The process then proceeds to block 550 in which the ECUs doing the most (largest volume of) processing may be determined based on the data from blocks 532 and 540.

From block 550, the process proceeds to block 560 and ends.

By performing the process of FIG. 5, knowledge of the system may be leveraged to feed into an attack surface of a given set of ECUs or nodes. An ECU or node which performs more acceptance filtering and processing than others may be considered to be a higher risk ECU. By determining which ECUs are the high-risk ECUs, a risk assessment for such ECU may be prioritized.

For example, in a system with 100 ECU images per vehicle, the process of FIG. 5 may identify the top 10 ECUs, and then focus further assessment and testing on these top 10 ECUs. The further assessment or a testing may use the various test solutions such as those described above with regard to FIG. 1 for binary processing, either in combination or individually for each node or ECU.

A server performing the analysis from FIGS. 1 to 5 may be any computing device, network node or element, or may be a combination of computing devices, network nodes or elements. For example, one simplified server that may perform the embodiments described above is provided with regards to FIG. 6.

Figure 6:
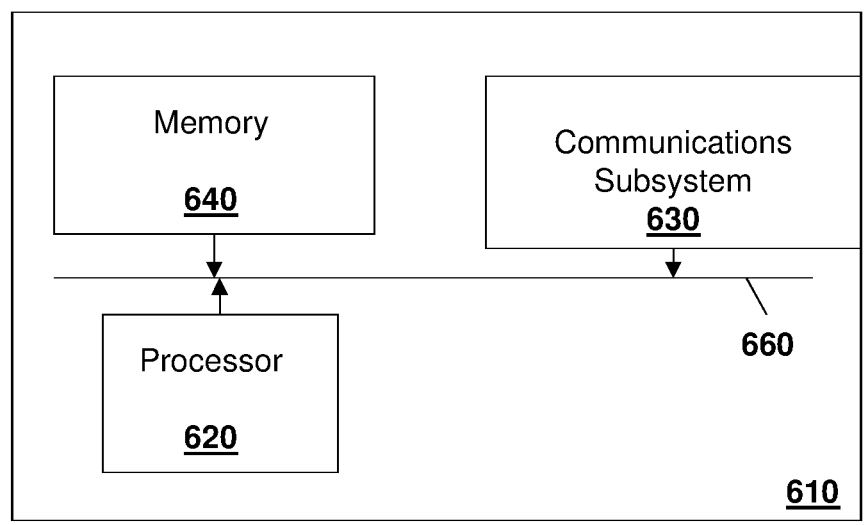
FIG. 6 is a block diagram of an example computing device or server capable of being used with the embodiments of the present disclosure.

In FIG. 6, server 610 includes a processor 620 and a communications subsystem 630, where the processor 620 and communications subsystem 630 cooperate to perform the methods of the embodiments described herein.

The processor 620 is configured to execute programmable logic, which may be stored, along with data, on the server 610, and is shown in the example of FIG. 6 as memory 640. The memory 640 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 620 may also be implemented entirely in hardware and not require any stored program to execute logic functions.

Alternatively, or in addition to the memory 640, the server 610 may access data or programmable logic from an external storage medium, for example through the communications subsystem 630.

The communications subsystem 630 allows the server 610 to communicate with other devices or network elements.

Communications between the various elements of the server 610 may be through an internal bus 660 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

In particular, the present disclosure may include the embodiments of the following clauses:

AA. A method at a computing device for determining processing characteristics of nodes within a system, the method comprising: receiving at the computing device a plurality of messages being passed within the system; analyzing a payload for each message of the plurality of messages to determine one or more message identifiers; performing an analysis of a binary image for each node within the system to find nodes filtering for the one or more message identifiers; and determining a relative amount of processing done by each of the nodes based on the plurality of messages.

BB. The method of clause AA, wherein the messages are passed on a Controller Area Network (CAN) bus.

CC. The method of clause BB, wherein the message identifier is a standard or extended CAN identifier.

DD. The method of any one of clauses AA to CC, wherein the analysis for the binary image further: identifies that the node is filtering for messages; and identifies the one or more message identifiers.

EE. The method of any one of clauses AA to DD, wherein the determining of the relative amount of processing ranks each node within the system based on an amount of processing performed at that node.

FF. The method of clause EE, further comprising performing vulnerability analysis for each node in the system in an order based on the rank of each node.

GG. The method of any one of clauses AA to FF, further comprising: finding anomalies in the plurality of messages.

HH. The method of clause GG, wherein the anomalies includes a high volume of messages or a high level of error frames in the plurality of messages.

II. The method of any one of clauses AA to HH, wherein the system is a vehicle system and wherein the nodes are electronic control units.

JJ. A computing device for determining processing characteristics of nodes within a system, the computing device comprising: a processor; and a communications subsystem, wherein the computing device is configured to: receive a plurality of messages being passed within the system; analyze a payload for each message of the plurality of messages to determine one or more message identifiers; perform an analysis of a binary image for each node within the system to find nodes filtering for the one or more message identifiers; and determine a relative amount of processing done by each of the nodes based on the plurality of messages.

KK. The computing device of clause JJ, wherein the messages are passed on a Controller Area Network (CAN) bus.

LL. The computing device of clause KK, wherein the message identifier is a standard or extended CAN identifier.

MM. The computing device of any one of clauses JJ to LL, wherein the analysis for the binary image further: identifies that the node is filtering for messages; and identifies the one or more message identifiers.

NN. The computing device of any one of clauses JJ to MM, wherein the computing device is configured to determine of the relative amount of processing by ranking each node within the system based on an amount of processing performed at that node.

OO. The computing device of clause NN, wherein the computing device is further configured to perform vulnerability analysis for each node in the system in an order based on the rank of each node.

PP. The computing device of any one of clauses JJ to OO, wherein the computing device is further configured to: find anomalies in the plurality of messages.

QQ. The computing device of any one of clauses JJ to PP, wherein the anomalies includes a high volume of messages or a high level of error frames in the plurality of messages.

RR. The computing device of any one of clauses JJ to QQ, wherein the system is a vehicle system and wherein the nodes are electronic control units.

SS. A computer readable medium for storing instruction code for determining processing characteristics of nodes within a system, the instruction code when executed by a processor of a computing device cause the computing device to: receive a plurality of messages being passed within the system; analyze a payload for each message of the plurality of messages to determine one or more message identifiers; perform an analysis of a binary image for each node within the system to find nodes filtering for the one or more message identifiers; and determine a relative amount of processing done by each of the nodes based on the plurality of messages.

TT. The computer readable medium of clause SS, wherein the messages are passed on a Controller Area Network (CAN) bus.

UU. The computer readable medium of clause TT, wherein the message identifier is a standard or extended CAN identifier.

VV. The computer readable medium of any one of clauses SS to UU, wherein the analysis for the binary image further: identifies that the node is filtering for messages; and identifies the one or more message identifiers.

WW. The computer readable medium of any one of clauses SS to VV, wherein the instruction code further causes the computing device to determine of the relative amount of processing by ranking each node within the system based on an amount of processing performed at that node.

XX. The computer readable medium of clause WW, wherein the instruction code further causes the computing device to perform vulnerability analysis for each node in the system in an order based on the rank of each node.

YY. The computer readable medium of any one of clauses SS to XX, wherein the instruction code further causes the computing to find anomalies in the plurality of messages.

ZZ. The computer readable medium of any one of clauses SS to YY, wherein the anomalies includes a high volume of messages or a high level of error frames in the plurality of messages.

AAA. The computer readable medium of any one of clauses SS to ZZ, wherein the system is a vehicle system and wherein the nodes are electronic control units.

The invention claimed is:

1. A method at a computing device for determining processing characteristics of nodes within a system, the method comprising:
   receiving at the computing device a plurality of messages being passed within the system;
   analyzing a payload for each message of the plurality of messages to determine one or more message identifiers;
   performing an analysis of a binary image for each node within the system to find nodes filtering for the one or more message identifiers, the binary image comprising executable code for execution by a processor of a respective node;
   finding anomalies in the plurality of messages based on volume of messages or amount of error frames processed by the nodes;
   determining a relative amount of processing done by each of the nodes based on the plurality of messages, thereby creating a ranking of the nodes; and
   performing a vulnerability analysis of the plurality of nodes based on the ranking of the nodes.

2. The method of claim 1, wherein the messages are passed on a Controller Area Network (CAN) bus.

3. The method of claim 2, wherein the message identifier is a standard or extended CAN identifier.

4. The method of claim 1, wherein the analysis for the binary image further:
   identifies that the node is filtering for messages; and
   identifies the one or more message identifiers.

5. The method of claim 1, wherein the determining of the relative amount of processing ranks each node within the system based on an amount of processing performed at that node.

6. The method of claim 1, wherein the system is a vehicle system and wherein the nodes are electronic control units.

7. A computing device for determining processing characteristics of nodes within a system, the computing device comprising:
   a processor communicatively coupled to a memory; and
   a communications subsystem,
   wherein the computing device is configured to:
   receive a plurality of messages being passed within the system;
   analyze a payload for each message of the plurality of messages to determine one or more message identifiers;
   perform an analysis of a binary image for each node within the system to find nodes filtering for the one or more message identifiers, the binary image comprising executable code for execution by a processor of a respective node;
   find anomalies in the plurality of messages based on volume of messages or amount of error frames processed by the nodes;
   determine a relative amount of processing done by each of the nodes based on the plurality of messages, thereby creating a ranking of the nodes; and
   perform a vulnerability analysis of the plurality of nodes based on the ranking of the nodes.

8. The computing device of claim 7, wherein the messages are passed on a Controller Area Network (CAN) bus.

9. The computing device of claim 8, wherein the message identifier is a standard or extended CAN identifier.

10. The computing device of claim 7, wherein the analysis for the binary image further:
    identifies that the node is filtering for messages; and
    identifies the one or more message identifiers.

11. The computing device of claim 7, wherein the computing device is configured to determine of the relative amount of processing by ranking each node within the system based on an amount of processing performed at that node.

12. The computing device of claim 7, wherein the system is a vehicle system and wherein the nodes are electronic control units.

13. A non-transitory computer readable medium for storing instruction code for determining processing characteristics of nodes within a system, the instruction code when executed by a processor of a computing device cause the computing device to:
    receive a plurality of messages being passed within the system;
    analyze a payload for each message of the plurality of messages to determine one or more message identifiers;
    perform an analysis of a binary image for each node within the system to find nodes filtering for the one or more message identifiers, the binary image comprising executable code for execution by a processor of a respective node;
    find anomalies in the plurality of messages based on volume of messages or amount of error frames processed by the nodes;
    determine a relative amount of processing done by each of the nodes based on the plurality of messages, thereby creating a ranking of the nodes; and
    perform a vulnerability analysis of the plurality of nodes based on the ranking of the nodes.

* * * * *